(12) United States Patent
Smeallie (10) Patent No.: US 6,550,790 B1
(45) Date of Patent: Apr. 22, 2003

(54) CART FOR A GOLF BAG, AND METHOD FOR USING

(76) Inventor: Kevin Smeallie, 4149 Wood Rd., Madison, OH (US) 44057

( * ) Notice: Subject to any disclaimer, the term of this patent is extended or adjusted under 35 U.S.C. 154(b) by 0 days.

(21) Appl. No.: 09/362,821

(22) Filed: Jul. 28, 1999

(51) Int. Cl.[7] .................................................. B62B 1/00
(52) U.S. Cl. .................................................. 280/47.17
(58) Field of Search ........................... 280/47.17, 47.19, 280/47.2, 47.24, 47.26, 47.315, 63, 638, 646, 645, 651, 652, 655, DIG. 6

(56) References Cited

U.S. PATENT DOCUMENTS

| | | | | | |
|---|---|---|---|---|---|
| 2,405,674 A | * | 8/1946 | Schliwa et al. | ........ | 280/DIG. 6 |
| 2,523,893 A | * | 9/1950 | Williamson | ............ | 280/DIG. 6 |
| 2,577,290 A | * | 12/1951 | Underwood | ................ | 280/646 |
| 2,687,895 A | * | 8/1954 | Rutledge | ................. | 280/47.26 |
| 3,719,247 A | * | 3/1973 | Hollis | ........................ | 180/19.3 |
| 3,753,473 A | * | 8/1973 | Hollis | ........................ | 180/19.3 |
| 3,883,150 A | * | 5/1975 | Varela | ..................... | 280/47.19 |
| 4,078,594 A | * | 3/1978 | Oeckl | ..................... | 206/315.4 |
| 4,396,327 A | * | 8/1983 | Menke | ........................ | 411/337 |
| 5,106,117 A | * | 4/1992 | Wang | .......................... | 280/646 |
| 5,725,351 A | * | 3/1998 | Guibert et al. | .............. | 280/646 |
| 5,826,764 A | * | 10/1998 | Beckham | ..................... | 224/274 |
| 5,944,132 A | * | 8/1999 | Davies et al. | ............... | 180/168 |
| 6,158,762 A | * | 12/2000 | Wong | .......................... | 248/169 |

* cited by examiner

Primary Examiner—Lesley D. Morris
Assistant Examiner—Paul Royal, Jr.
(74) Attorney, Agent, or Firm—Ansel M. Schwartz (57) ABSTRACT

A cart for a golf bag. The cart includes a spine having a top portion and a bottom portion. The cart includes a handle connected to the vertical spine and extending from the top portion forward of the spine. The handle has a stable height from ground. The cart includes a support mechanism connected to and extending from the bottom portion. The support mechanism is able to support the spine and the golf bag in a standing position. The support mechanism is able to roll along ground to facilitate the movement of the spine and golf bag, wherein the support mechanism together with the spine and the handle define a center of gravity over the support mechanism and behind the spine when the spine-is tilted forward and the handle is at least eight inches below its stable height.

28 Claims, 8 Drawing Sheets

VIEW A-A

CART FOR A GOLF BAG, AND METHOD FOR USING

FIELD OF THE INVENTION

The present invention is related to golf carts. More specifically, the present invention is related to golf carts having a center of gravity behind its wheel base when there is a golf bag on the cart regardless of the cart's position (standing or pulling).

BACKGROUND OF THE INVENTION

Standard pull carts are designed to mount a golf bag on an angle. The handle of a standard pull cart is mounted on a parallel angle to the golf bag and extends higher than the golf bag. Positioning a golf bag at an angle less than 80° or more than 100° makes club removal difficult. Extending the pull cart handle beyond the top of the golf bag on a similar angle and plain with the golf bag adds to the difficulty of club removal. The cart of the present invention eliminates this problem by mounting the golf bag in an absolute vertical position, between 80–100°, and by positioning the handle away from the golf bag at a location equal to or less than the top of the golf bag. Secondly, standard pull carts generally fall forward on occasion, causing clubs to fall out of the golf bag. This happens due to the center of gravity of the golf bag being positioned in a location close to the pivot point of the pull cart when the cart is in the standing position. The cart of the present invention locates the center of gravity centrally between the supports, (wheels and stabilizer) well behind the pivot point, when the cart is in the standing position. The stabilizer bar of the cart of the present invention allows for central positioning of the center of gravity, which in turn allows for the vertical positioning of the golf bag on the pull cart, and stops the motion of the cart after being released to the somewhat automatic standing position from the pulling position. The term somewhat automatically means that because the center of gravity remains behind the pull cart pivot point in the pulling position, (when the handle is between 27 inches and 36 inches from the ground while pulling—this will occur for most players), when the handle is released, the cart of the present invention will return to a standing position without any influence from the golfer.

SUMMARY OF THE INVENTION

The present invention pertains to a cart for a golf bag. The cart comprises a spine having a top portion and a bottom portion. The cart comprises a handle connected to the spine and extending from the top portion forward of the spine. The handle pivot has a stable height from ground. The cart comprises a support mechanism connected to and extending from the bottom portion. The support mechanism is able to support the spine and the golf bag in a standing position. The support mechanism is able to roll along the ground to facilitate the movement of the spine and golf bag, wherein the support mechanism together with the spine and the handle define a center of gravity over the support mechanism and behind the spine when the spine is tilted forward and the handle is at least eight inches below its stable height.

The present invention pertains to a method for moving a golf bag. The method comprises the steps of grabbing a handle of a cart holding the golf bag. Then there is the step of tilting the handle of the cart holding the golf bag forward wherein the center of gravity of the cart with the golf bag is behind the wheel base of the cart and the handle is at least 8 inches below a stable height. Next there is the step of pulling the cart along the ground. Then there is the step of releasing the cart without applying any force to it, wherein the cart under only force of gravity moves to a stable position with the golf bag essentially vertical from the ground and the handle returning to its stable height.

The present invention pertains to a cart for a golf bag. The cart comprises a spine having a top portion and a bottom portion. The cart comprises a handle connected to the spine and extending from the top portion forward of the spine, said handle having a stable height from ground. The cart comprises a support mechanism connected to and extending from the bottom portion. The support mechanism is able to support the spine and the golf bag in a standing position. The support mechanism is able to roll along the ground to facilitate the movement of the spine and golf bag. The cart comprises a spring-loaded chain with a clasp attached to the spine for holding the bag to the spine.

Differences between the cart, and a standard prior art cart (hereinafter "standard").

1) Club removal
   a) Cart easiest possible due to vertical mounting.
   b) Standard has difficult club removal due to clubs laying on top of each other from angular mounting.
   c) Cart easiest due to handle location not higher than top of golf bag and handle extending perpendicular and away from golf bag.
   d) Standard has difficult club removal from handle/club interference. Handle extends along and above the golf bag causing interference with club removal.
2) Stability
   a) Cart is the most stable cart available due to centrally located center of gravity and auto stand-up feature.
   b) Standard is unstable due to center of gravity location around pivot point (slightly behind or in line and above wheels).
   c) Cart will stand up when handle is released on even ground regardless of center of gravity or how the handle is released.
   d) Standard may tilt forward when handle is released.
      1) If center of gravity is in front or too close to wheels.
      2) If handle is released by pulling up causing the cart to bounce and fall forward from its standing position.

BRIEF DESCRIPTION OF THE DRAWINGS

In the accompanying drawings, the preferred embodiment of the invention and preferred methods of practicing the invention are illustrated in which.

DETAILED DESCRIPTION

Referring now to the drawings wherein like reference numerals refer to similar or identical parts throughout the several views, and more specifically to FIGS. 1a–1e thereof, there is shown a cart 82 for a golf bag 90. The cart 82 comprises a spine 50 having a top portion 94 and a bottom portion 96. The cart 82 comprises a handle 28 connected to the spine 50 and extending from the top portion 94 forward of the spine 50. The handle 28 has a stable height 92 from ground 98. The cart 82 comprises a support mechanism 100 connected to and extending from the bottom portion 96. The support mechanism 100 is able to support the spine 50 and the golf bag 90 in a standing position. The support mechanism 100 is able to roll along ground 98 to facilitate the movement of the spine 50 and golf bag 90, wherein the support mechanism 100 together with the spine 50 and the handle 28 define a center of gravity 106 over the support mechanism 100 and behind the spine 50 when the spine 50 is tilted forward and the handle 28 is at least eight inches below its stable height 92.

Preferably, the support mechanism 100 includes a 3-foot support. The support mechanism 100 preferably includes a wheel base 62 connected to the spine 50 and extending from the bottom portion 96. The wheel base 62 has a first side 108 and a second side 110. There is preferably a first wheel and a second wheel connected to the first side 108 and second side 110, respectively, of the wheel base 62. The first wheel and second wheel being a first foot 112 and a second foot 114 of the 3-foot support. Preferably, there is a stabilizer bar 56 connected to and extending from the bottom portion 96 behind the spine 50. The stabilizer bar 56 has a stabilizer foot 54 which is a third foot 116 of the 3-foot support mechanism 100. Preferably, the stabilizer bar 56, wheel base 62, handle 28, and the support mechanism 100 define the center of gravity 106 behind the center of the wheels when the spine 50 is tilted and the handle 28 is at least 8 inches below its stable height 92 and the support mechanism 100 is on level ground 98.

Figure 1A:
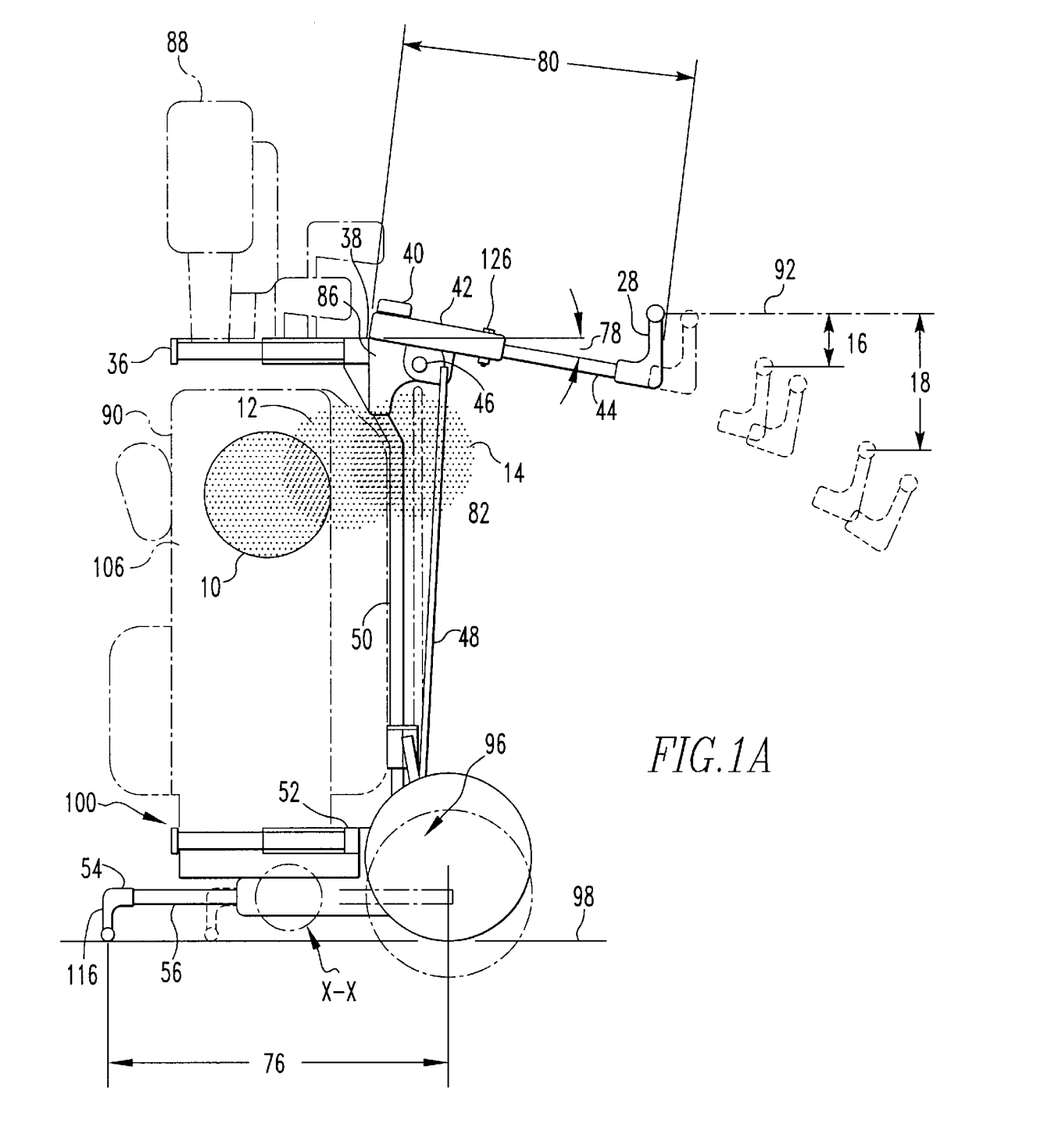
FIGS. 1a–1e are schematic representations of a side, front, overhead section X—X, and section B—B view, respectively, of a cart of the present invention and portions of the cart.
Figure 1B:
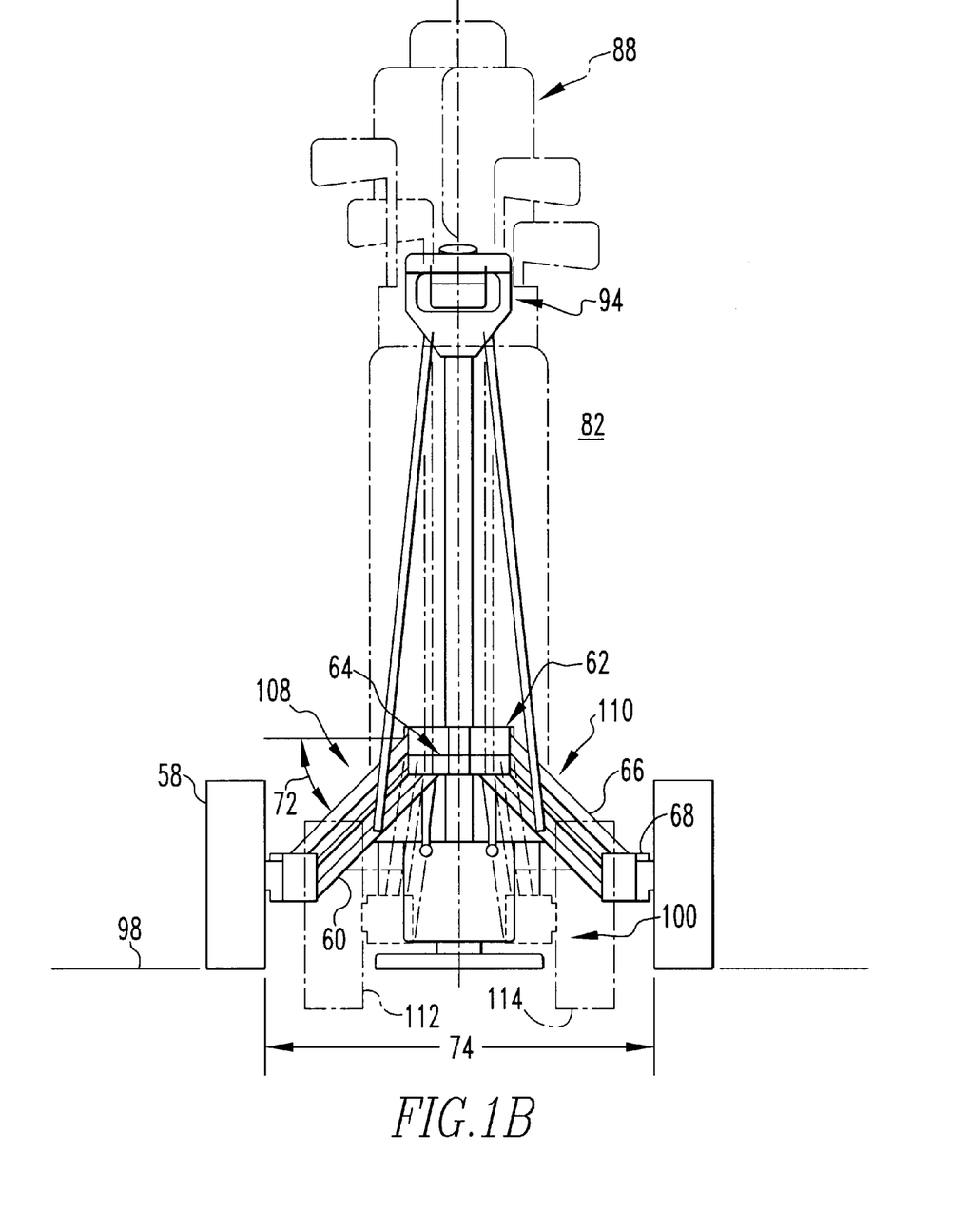
Figure 1C:
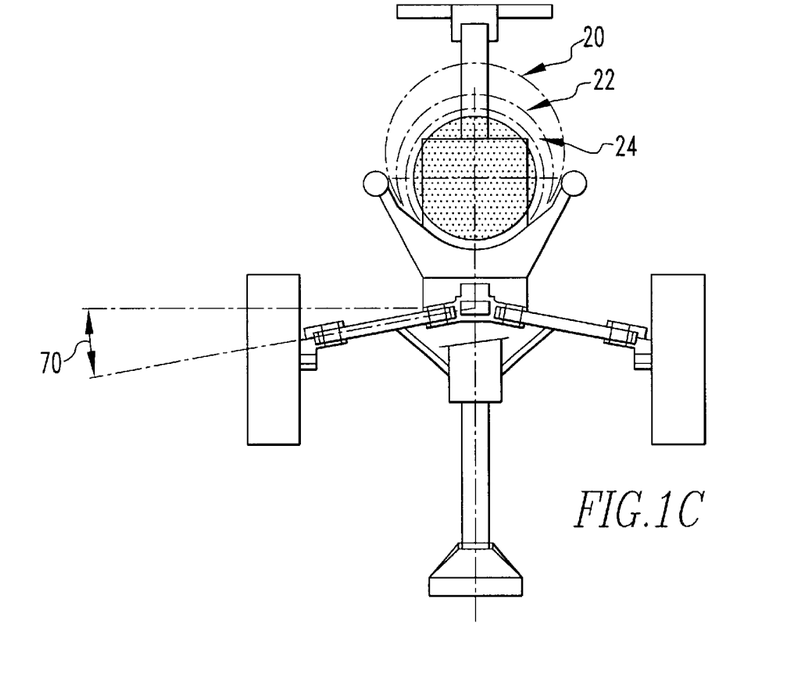
Figure 1D:
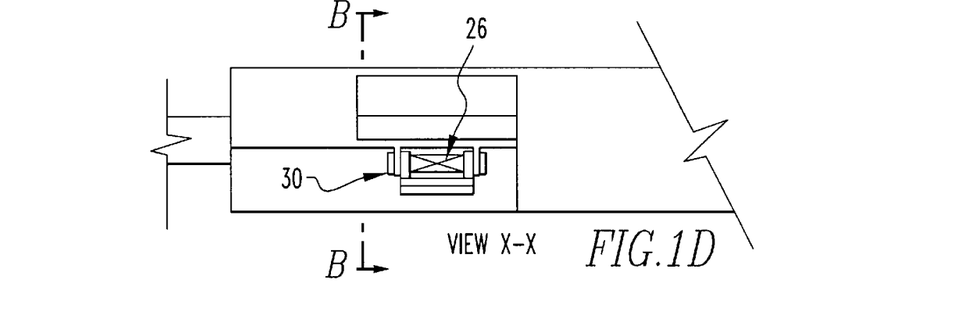
Figure 1E:
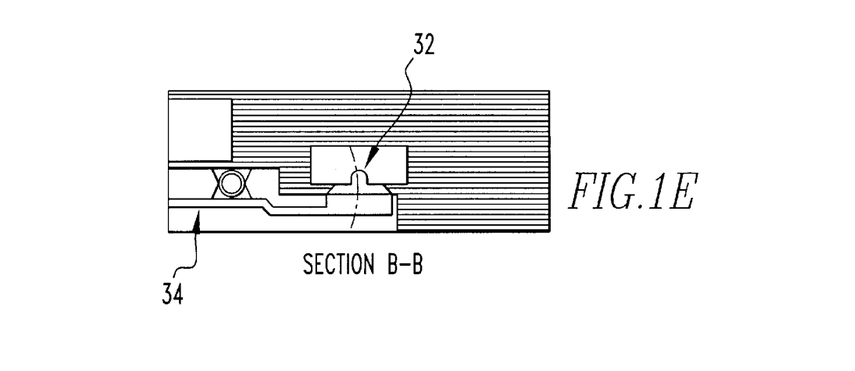
Figure 2A:
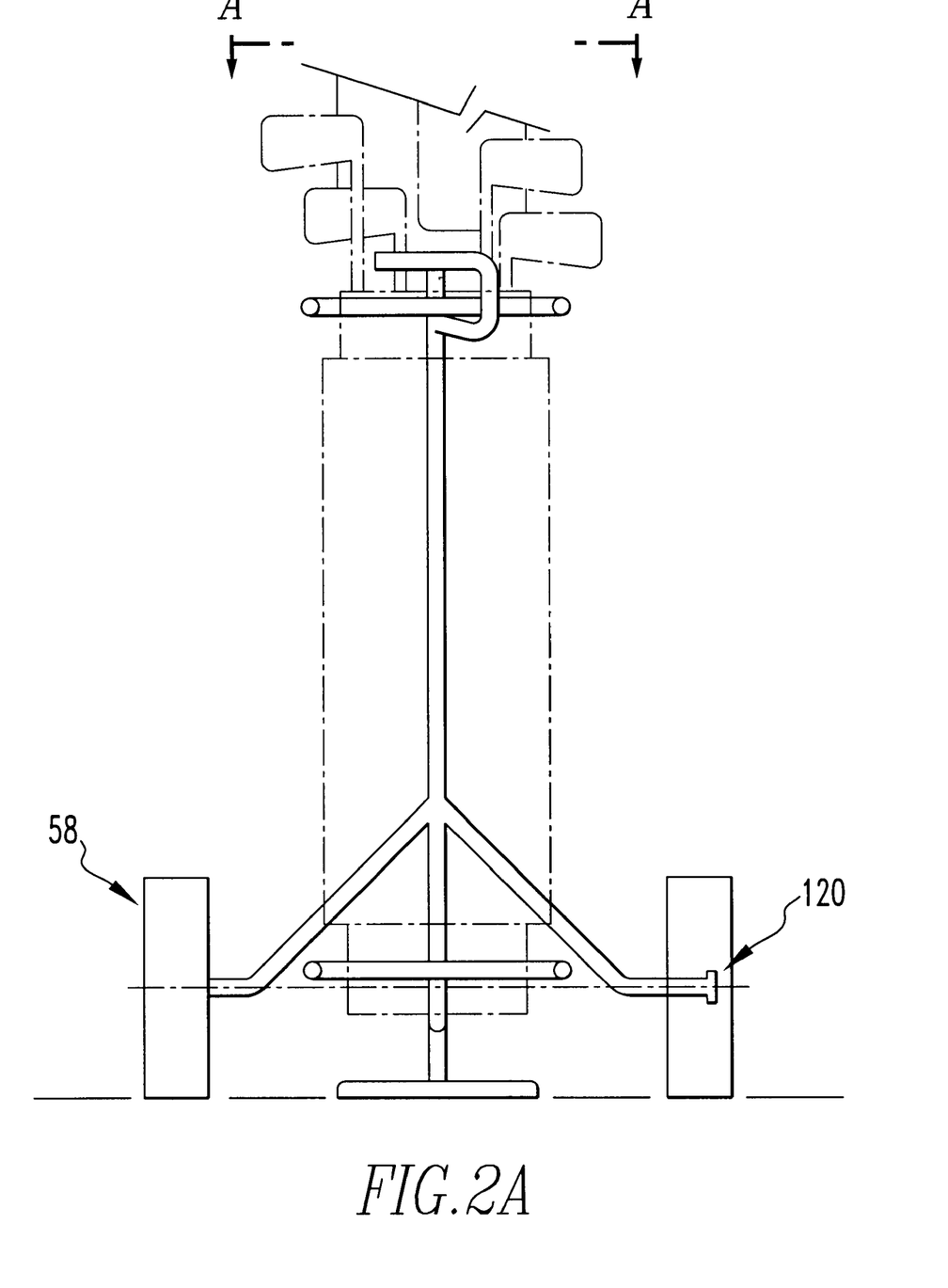
FIGS. 2a–2d are schematic representations of a front, side, overhead and section A—A view, respectively, of an alternative embodiment of a cart of the present invention and portions of the alternative embodiment of the cart.
Figure 2B:
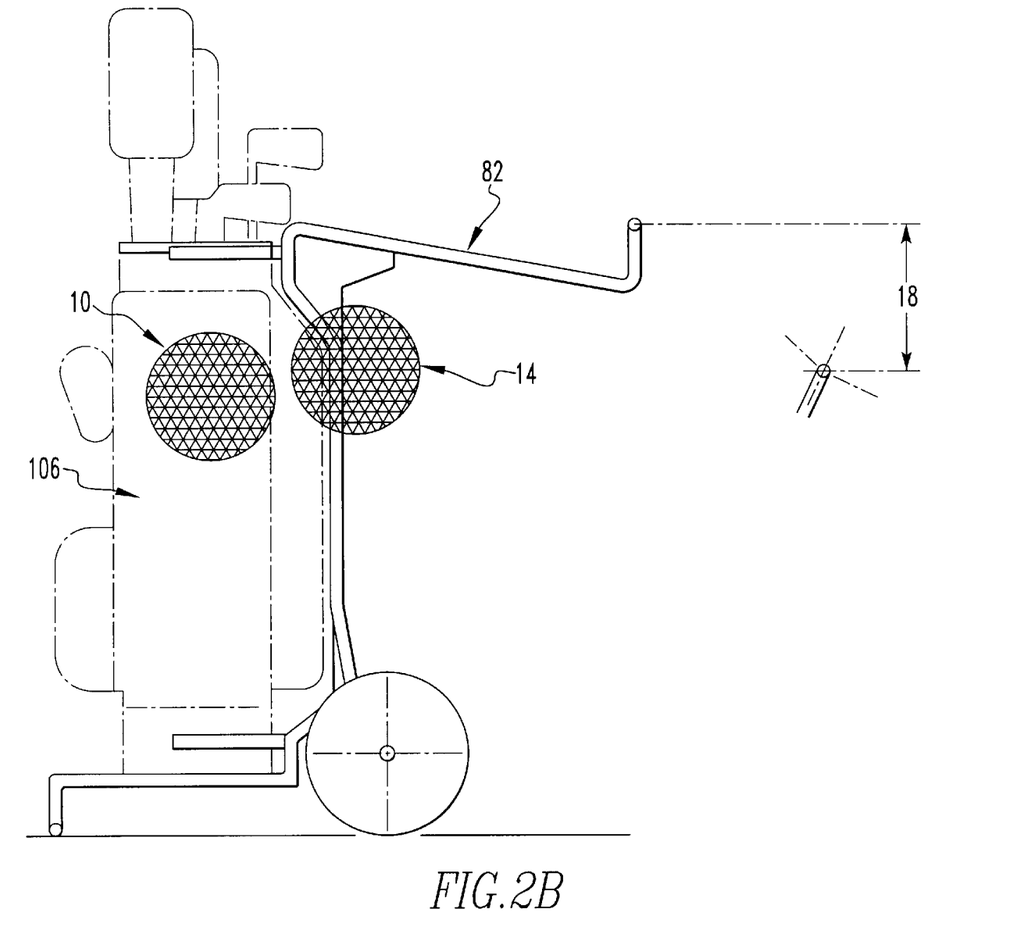
Figure 2C:
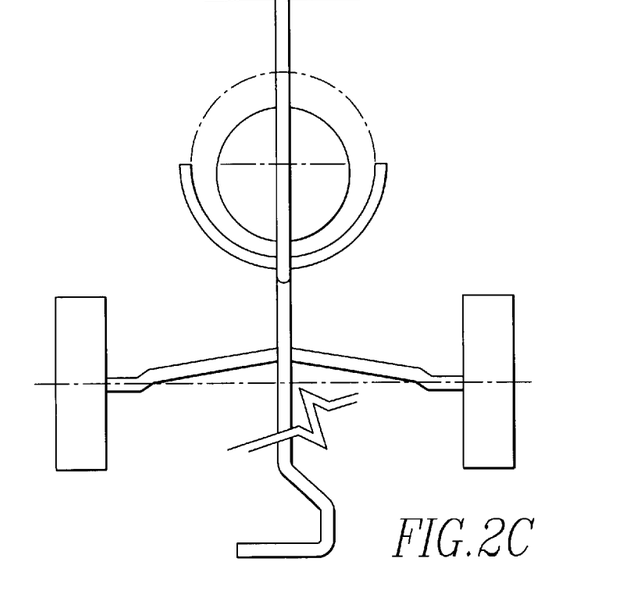
Figure 2D:
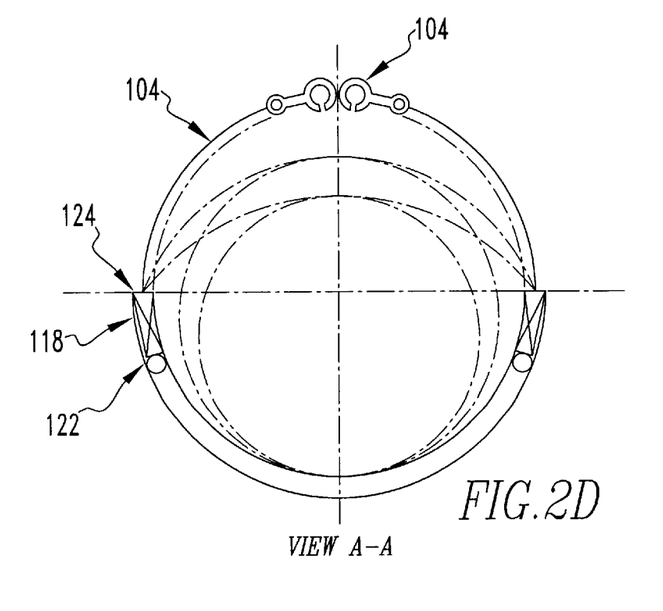

The handle 28 preferably will automatically return to its stable position from at least 8 inches below its stable position with only gravity acting on the handle 28. Preferably, the handle 28 extends at an angle theta of less than 90° from the spine 50. Preferably, the handle 28 is adjustable. Preferably, the handle 28 is adjustable so that the center of gravity 106 remains positioned behind the wheel base 62 for at least 8 inches of forward tilt.

The length of the stabilizer bar 56 is preferably adjustable so the stabilizer foot 54 can be positioned outside the circumference of the golf bag 90 when the golf bag 90 is disposed on the support mechanism 100. The stabilizer bar 56 preferably has a stabilizer bar lock 34 for locking the stabilizer bar 56 into a desired position.

The spine 50 is preferably at an angle between 80°–100° with ground 98. Preferably, the spine 50 and golf bag 90 are perpendicular to the ground 98 in the standing position. Club removal from the bag 90 is preferably facilitated by the vertical mounting of the golf bag 90 on the cart 82 and the position of the handle 28 relative to the spine 50. Preferably, the spine 50 has a handle pivot frame 42 attached to the top portion 94, and including a handle screw 40 trapped to the handle pivot frame 42, as shown in FIGS. 4a, 4b and 5a–5e.

The present invention pertains to a method for moving a golf bag 90. The method comprises the steps of grabbing a handle 28 of a cart 82 holding the golf bag 90. Then there is the step of tilting the handle 28 of the cart 82 forward wherein the center of gravity 106 of the cart 82 is behind the wheel base 62 of the cart 82 and the handle 28 is at least 8 inches below a stable height 92. Next there is the step of pulling the cart 82 along the ground 98. Then there is the step of releasing the cart 82 without applying any force to it, wherein the cart 82 under only force of gravity moves to a stable position with the golf bag 90 essentially vertical from the ground 98 and the handle 28 returning to its stable height 92. Preferably, after the releasing step, there is the step of lifting a golf club essentially vertically upwards out of the bag 90.

Figure 3:
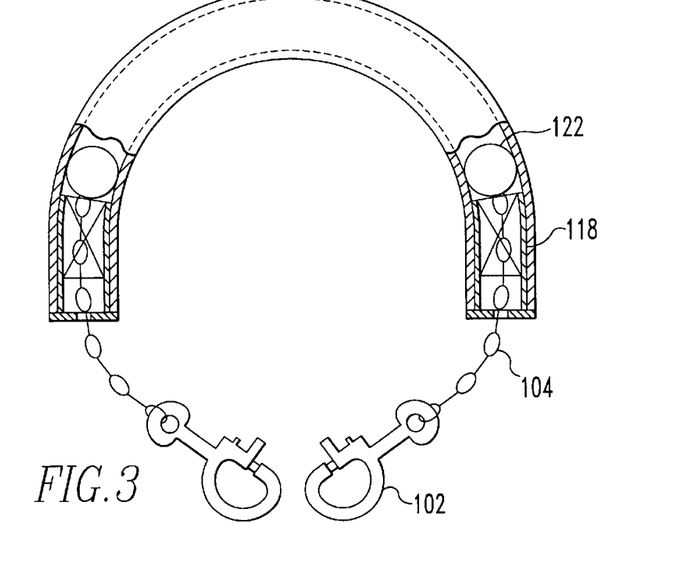
FIG. 3 is a schematic representation of a spring-loaded chain from the alternative embodiment of a cart of the present invention.

The present invention pertains to a cart 82 for a golf bag 90. The cart 82 comprises a spine 50 having a top portion 94 and a bottom portion 96. The cart 82 comprises a handle 28 connected to the vertical spine 50 and extending from the top portion 94 forward of the spine 50, said handle 28 having a stable height 92 from ground 98. The cart 82 comprises a support mechanism 100 connected to and extending from the bottom portion 96. The support mechanism 100 is able to support the spine 50 and the golf bag 90 in a standing position. The support mechanism 100 is able to roll along ground 98 to facilitate the movement of the spine 50 and golf bag 90. The alternative embodiment of a cart of the present invention comprises a spring-loaded chain 104 with a clasp 102 attached to the spine 50 for holding the bag 90 to the spine 50, as shown in FIG. 3.

The following is a list of elements of the cart 82 with preferred dimensions where indicated.

| | |
|---|---|
| 10 | INDICATES CENTER OF GRAVITY 106 OF 8", 9", OR 10" BAG 90 FULL WITH CLUBS 88 STANDING |
| 12 | INDICATES CENTER OF GRAVITY 106 OF 8", 9", OR 10" BAG 90 WITH CLUBS 88 TILTED FORWARD WHILE PULLING |
| 14 | INDICATES CENTER OF GRAVITY 106 OF 8", 9", OR 10" BAG 90 WITH CLUBS 88 OF THE MAXIMUM TILTED POSITION WHILE MAINTAINING THE CART'S ABILITY TO STAND UP AUTOMATICALLY ONCE THE PULL CART HANDLE 28 IS RELEASED |
| 16 | INDICATES MAXIMUM FORWARD TILT POSITION OF PULL CAR HANDLE 28 WHILE STILL MAINTAINING THE CART'S ABILITY TO STAND UP AUTOMATICALLY ONCE THE PULL CART HANDLE 28 IS RELEASED (8"), (HANDLE 28 FULLY RETRACTED) |
| 18 | INDICATES MAXIMUM FORWARD TILT POSITION OF PULL CART HANDLE 28 WHILE STILL MAINTAINING THE CART'S ABILITY TO STAND UP AUTOMATICALLY ONCE THE PULL CART HANDLE 28 IS RELEASED (10"), (HANDLE 28 FULLY EXTENDED) |
| 20 | DIAMETER OF A 10.5" BAG 90 SITTING ON THE CART 82 |
| 22 | DIAMETER OF A 9" BAG 90 SITTING ON THE CART 82 |
| 24 | DIAMETER OF AN 8" BAG 90 SITTING ON THE CART 82 |
| 26 | LOCK SPRING |
| 28 | HANDLE |
| 30 | LOCK PIVOT PIN |
| 32 | LOCK PIN |
| 34 | STABILIZER BAR LOCK |
| 36 | COMMERCIALLY AVAILABLE NYLON STRAP WITH CONNECTOR |
| 38 | UPPER FRAME |
| 40 | HANDLE SCREW |
| 42 | HANDLE PIVOT FRAME |
| 44 | STABILIZER HANDLE PIVOT ARM |
| 46 | HANDLE PIVOT PIN |
| 48 | WHEEL PIVOT ROD |
| 50 | SPINE |
| 52 | FRAME |
| 54 | STABILIZER FOOT |
| 56 | STABILIZER BAR |
| 58 | COMMERCIALLY AVAILABLE WHEEL |

-continued

60 LOWER WHEEL PIVOT LEG
 62 WHEEL BASE
 64 WHEEL PIVOT FRAME AND BRACE
 66 UPPER WHEEL PIVOT LEG
 68 WHEEL CONNECTING FRAME AND OPPOSITE HAND
 70 10 DEGREE ANGLE TO STABILIZE VERTICAL MOUNTING WHILE ALLOWING FOR EFFORTLESS FORWARD TILT WHEN PULLING
 72 45 DEGREE ALLOWS FOR ELEVATED WHEEL PIVOT FRAME 64 WHICH IN TURN HELPS TO KEEP VERTICALLY MOUNTED BAG 90 FROM TIPPING
 74 20.50" FOR BAG 90 STABILITY
 76 20.50" FOR BAG 90 STABILITY OF ANY SIZE GOLF BAG 90, LENGTH CAN BE REDUCED DOWN TO 18.25" FOR SMALLER BAGS 90 WHILE MAINTAINING STABILITY
 78 10 DEGREES KEEPS HANDLE AWAY FROM CLUBS 88 AND PROMOTES FORWARD TILT WHEN DESIRED
 80 17.25" IN RETRACTED PULLING POSITION
    19.25" IN EXTENDED PULLING POSITION
    (3) HANDLE EXTENDED PULLING POSITIONS ACCOMMODATE AUTOMATIC STAND FEATURE FOR PEOPLE WITH A PALM TO GROUND 98 DIMENSION OF 27" TO 36" (MOST OF THE POPULATION)
 82 CART OF EMBODIMENT 1
 84 THREADED ROD STAINLESS STEEL
 86 HELICOIL
 88 CLUBS
 90 BAG
 92 STABLE HEIGHT
 94 TOP PORTION
 96 BOTTOM PORTION
 98 GROUND
100 SUPPORT MECHANISM
102 CLASP
104 CHAIN
106 CENTER OF GRAVITY
108 FIRST SIDE
110 SECOND SIDE
112 FIRST FOOT
114 SECOND FOOT
116 THIRD FOOT
120 WHEEL RETAINER
122 SPRING RETAINER
126 NUT
128 KNOB RETAINER
130 UPPER SUPPORT FRAME
132 LOWER SUPPORT FRAME
134 CART OF EMBODIMENT 2
136 STEEL PIPE FRAME
138 BOLT
140 PLASTIC LEVER
142 314" SHOULDER BOLT

UNIQUE FEATURES

Stabilizer bar 56 and lock

Easy club removal

Automatic stand-up feature when the handle 28 is released within range shown on FIG. 1*a*.

Figure 4A:
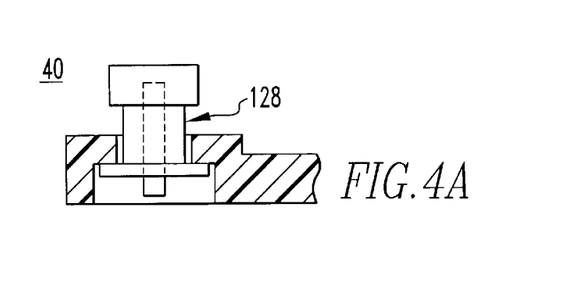
FIGS. 4a and 4b are schematic representations of a handle screw trapped in a handle bracket, and engaged with the upper frame, respectively. The use of a stainless steel helicoil permanently fastened within the plastic to reinforce the bolted connection is also shown.
Figure 4B:
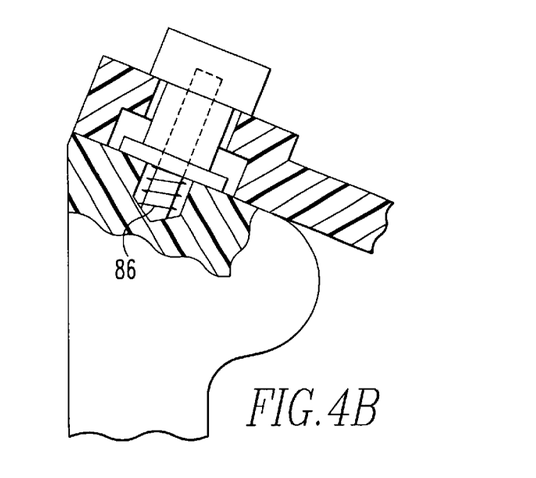
Figure 5A:
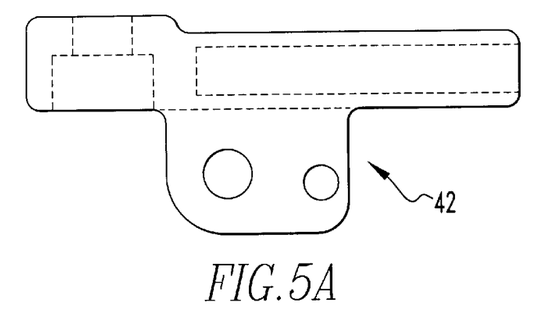
FIGS. 5a–5e are schematic representations of side, front, side, side and overhead views, respectively, of components of the knob-frame assembly.
Figure 5B:
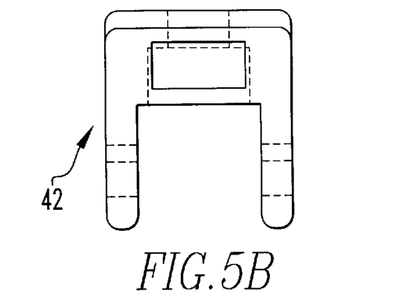
Figure 5C:
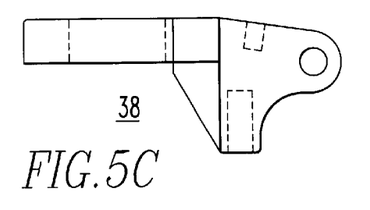
Figure 5D:
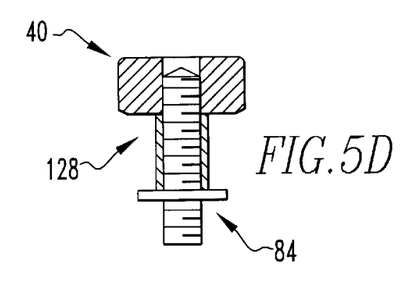
Figure 5E:
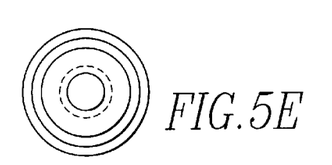

Handle screw 40 trapped in handle pivot frame 42 (FIGS. 4*a* and 4*b*).

Spring loaded chain design 102, 104, 118, 122, 124 used to fasten bag to cart (FIG. 3).

The stabilizer bar 56 is used to support a golf bag 90 on the pull cart 82 perpendicular to the ground 98. The stabilizer bar 56 is positioned 90° to the pull cart 82 spine 50 and is adjustable to three positions. These positions are relative to the size of the golf bag 90 connected to the pull cart 82. A golf bag 90 having an opening of approximately 8 inches and of slight stature would use the first stabilizer bar 56 setting. This position utilizes the shortest possible operating stabilizer bar 56 length. A golf bag 90 with a 9-inch opening and of larger size would use the middle stabilizer bar 56 setting. In this position, the stabilizer bar 56 is extended longer than for a smaller bag 90. A golf bag 90 with a 10½-inch opening, the largest golf bag 90, would require the stabilizer bar 56 to be positioned in the fully extended location or the third position.

The reason for the stabilizer bar 56 settings are to keep a golf bag 90 centered between the wheel base 62 and the stabilizer foot 54. The stabilizer shoe 54 is the third foot 116 of the pull cart 82. Smaller golf bags 90 could use a larger golf bag's 90 stabilizer bar 56 position without affecting the performance of the pull cart 82. Centrally locating a golf bag 90 among three supports allows for the golf bag 90 to be vertically mounted while remaining stable and not tipping over on relatively uneven ground 98. The stabilizer bar lock 34 is used to lock the stabilizer bar 56 into any of its operating positions. The stabilizer bar lock 34 is a spring-loaded lever coupled to a stainless steel pin 30 positioned perpendicular to the stabilizer bar 56. The lever is depressed via a finger or thumb, the stabilizer bar 56 is moved to an operating position, and the lever is released. The pin 32 on the lever will engage an equal diameter opening in the stabilizer bar 56. The spring 26 on the lever holds the stabilizer bar 56 in its locked position.

The vertically mounted golf bag 90 along with a pull cart handle 28 extended away from the pull cart 82 keeps the clubs 88 from interfering with the handle 28 as the clubs 88 are removed from the golf bag 90. The vertical mounting allows for clubs 88 to be lifted straight up from the bag 90, free from interference from other clubs 88 which otherwise would lay against each other.

The reason for the stabilizer design is to mount a golf bag 90 vertically on the cart 82 and to have the cart 82 stand up when the handle 28 is released. For purposes herein, vertical means approximately 90°. However, vertical as defined herein, more specifically means a position between 80°–100°. The reasons that vertical mounting is the ideal position of a golf bag 90 on a cart 82 are as follows:

1) Easiest club removal possible
   a) Clubs 88 don't lay on top of each other when the golf bag 90 is standing.
   b) Clubs 88 are easily retrieved without interference from-other clubs 88.
2) Vertical mounting allows for center of gravity 106 to be positioned well behind wheels and centrally among 3 feet (2 wheels and 1 stabilizer foot 54).

This means greater stability when standing and the center of gravity 106 can be maintained behind the wheels or pivot point while pulling allowing the cart 82 to automatically stand up when the handle 28 is released.

The vertically mounted, centrally located golf bag 90 is coupled to an upright pull cart 82 with wheel legs cut at compound angles and a handle 28 positioned and a length, angle, and location that allows the pull cart 82 to stand up without outside influence other than releasing the handle 28 for an average sized person. The stabilizer bar 56 and wheel base 62 steady the pull cart 82 as it impacts the ground 98 upon releasing the handle 28. The relationship among the center of gravity 106, wheel location, handle 28 length, angle, and position make this possible. The stabilizer design allows for the pull cart 82 to be pivoted with the handle 28 rotating forward until the handle 28 reaches a position 8 inches below its standing position while maintaining the cart's ability to automatically stand up. This 8 inches of motion accounts for the position of most people's hands while pulling a pull cart 82. I.e., arm hanging by your side below your hip. For people whose hand position is closer or further from the ground 98, the handle 28 is made linearly adjustable to accommodate most probabilities. The key to the design is to keep the center of gravity 106 behind the center of the wheels when the cart 82 is tilted forward on even ground 98. There are no additional weights added to the stabilizer bar 56 or cart 82 for that matter. Counterweights could have been used to make the cart automatically stand up from any pulling position even if tilted forward all the way to the ground. Counterweights were not used in an effort to keep the weight of the cart minimal. However, the option of counterweight usage as described remains within the domain of this cart design.

Center of Gravity 106 Variations

The center of gravity 106 is shown as an 8-inch circle and not as a dot in FIG. 1*a* for the following reasons.
1) The center of gravity 106 of the bag 90 on the cart 82 will vary to due to the bag 90 size, length of clubs 88, weight of clubs 88, number of golf balls in bag 90, number of accessories in bag 90; i.e., shoes, towels, rain gear, etc.
2) The more objects stored in the bag 90, the better or lower the center of gravity 106 becomes.
3) The 8-inch circle on the cart 82 indicates the highest location of various center of gravity 106 based on various bag 90 sizes, a minimum amount of balls, accessories, etc. (worst case scenarios).

Once purchased, a golfer will remove the pull cart 82, in the folded position, from the box. The golfer will then set the pull cart 82 on the ground 98 and pull the handle 28 arm up. This will open the wheels. Once the handle 28 is up, the golfer will lock the handle 28 in place by tightening the hand knob. The golfer will then pull the stabilizer bar 56 out from its storage position to 1 of 3 positions relative to the size of his golf bag 90. To pull the stabilizer bar 56 out, he will depress the stabilizer lock lever 34 and extend the stabilizer bar 56 until reaching the desired position. The golfer will then release the lock lever 34, locking the stabilizer bar 56 in place. The golfer will then place a golf bag 90 on the pull cart 82 and secure it with the nylon straps with connectors' 36. The golfer may then choose to increase the handle position to optimize the auto stand-up feature. To do so, the golfer will remove the bolt 138 and nut 126 that attach the handle 28 to the handle pivot frame 42, adjust the handle 28 position, replace the bolt 138, and tighten the nut 126 to re-fasten the handle 28 to the handle pivot frame 42. The pull cart 82 is now ready for use. The golfer simply pushes the handle 28 down to tilt the cart 82 forward in its pulling position or release the handle 28 to stand the cart 82 up. Severe slopes will require the golfer to position the cart 82 with the stabilizer bar 56 below the wheels 58 to avoid tipping. The cart 82 will automatically stand up on relatively even ground 98. When the golfer completes his round, he will leave the bag 90 attached to the pull cart 82. The golfer will then depress the stabilizer lock 34 and return the stabilizer bar 56 to its stored position. The golfer will then loosen the handle screw 40 completely and fold the handle 28 and wheels to their stored positions. The handle screw 40 is designed to remain in the handle 28 whether locked or unlocked.

A helicoil 86 is used to eliminate any possibility of cross threading the handle screw 40 when the handle pivot frame 42 engages the upper frame 38. The handle screw 40 is trapped in the handle pivot frame 42 via the knob retainer 128 and the threaded rod 84 in the knob retainer 128 engage with the helicoil 86 threads in the upper frame 38 to lock the handle 28 in the pulling position. A helicoil 86 is a steel thread resembling a spring, which is fastened into a plastic hole to reinforce the plastic tapped hole in the upper frame 38. Now instead of a steel threaded rod engaging a plastic tapped hole, it engages a steel tapped hole eliminating any possibility of damage to the plastic.

The stabilizer bar 56 of embodiment 1 shown in FIG. 1*a* is made from aluminum and plastic molded parts. The handle arm 44 is made from rectangular aluminum coupled to an injection molded plastic handle 28 at one end and an injection molded plastic handle pivot frame 42 with locking handle screw 40 at the other. The hand screw 40 consists of an injection molded knob, a threaded stainless steel rod and an injection molded plastic knob retainer 128 that traps the knob 40 in the handle pivot frame 42 whether or not the handle arm 44 is folded or opened. When the pull cart 82 is opened (unfolded), the handle arm 44 attaches to the spine 50. The spine 50 is made from rectangular aluminum coupled to an injection molded plastic upper frame 38 at the top, an injection molded wheel pivot frame 64 below the center, and an injection molded plastic stabilizer frame 52 at the bottom. The plastic upper frame 38 provides a threaded connection for coupling with the handle 28 knob and houses the nylon straps 36 used to attach a golf bag 90 to the pull cart 82. The wheel pivot frame 64 houses the upper and lower pivot legs for the wheels 58. The upper and lower pivot legs are attached to the handle 28 arm by two stainless steel rods. This connection allows the handle 28 arm and pivot legs to open and fold together. The plastic stabilizer frame 52 houses nylon straps 36 used to hold the golf bag 90 on the pull cart 82. The frame 52 supports the golf bag 90, and houses the stabilizer bar 56 and stabilizer bar lock 34. The stabilizer bar 56 is made from rectangular aluminum coupled to an injection molded plastic shoe 54. The shoe 54 connects the stabilizer bar 56 to the ground 98. The stabilizer bar 56 slides toward the wheels 58 or away from the wheels 58 depending upon whether or not the stabilizer bar 56 is stored or in use. In the operating position, the stabilizer bar 56 is held in place by the stabilizing bar lock 34. The stabilizing bar lock 34 is a combination of an injection molded plastic lever 140, a stainless steel pin 30, and a stainless steel torsion spring 26. The plastic lever 140 pivots against the lock spring 26 to lock and unlock. The pull cart 82 stands on three points. The stabilizer foot 54 and two wheels 58. The wheels 58 are coupled to the wheel legs via opposite hand injection molded plastic wheel connecting frames 68. The commercially available wheels 58 attach to the wheel connecting frames 68 via ¾" shoulder bolts 142.

The cart 134 of embodiment 2, as shown in FIGS. 2*a*–2*d*, is similar to the cart 82 of embodiment 1. However, the cart 134 in embodiment 2 is rigid and is made of steel pipe and chain 104. The cart 134 in embodiment 2 has all the same qualities as the cart 134 of embodiment 1 in its operating (unfolded) condition. The cart 134 in embodiment 2 is designed for use as a rental cart at golf courses, not as a privately owned cart. The cart 82 in embodiment 2 consists of one steel pipe frame 136 shaped identically to the geometry of the cart 82 of embodiment 1. The upper and lower support frames are steel pipe welded to the cart 134. Each support frame houses two spring-loaded stainless steel chains 104 with clasps 102, four spring-loaded chains 104 with clasps 102 total. These chains 104 are used to fasten a golf bag 90 to the pull cart 82. The stabilizer bar 56 is an extension of the frame 52.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A golf bag cart comprising:
a golf bag with contents including golf clubs, golf balls and accessories;
a spine having a top portion and a bottom portion, and a top side and an underside, said spine having a support frame which extends from the top side away from the underside and is disposed about the golf bag to support and hold the golf bag with the spine in a position between 80°–100° with ground, the spine having an angle between 80°–100° with ground when the cart is in a standing position;
a handle connected to the spine and extending from the top portion forward of the spine, said handle having a stable height from ground; and
a support mechanism connected to and extending from the bottom portion, said support mechanism able to support the spine and the golf bag in the standing position, said support mechanism having a wheel mechanism with wheel legs cut at compound angles with respect to each other on which the support mechanism rolls along ground to facilitate the movement of the spine and golf bag, the support mechanism together with the golf bag, the spine and the handle define a center of gravity over the support mechanism and behind the spine when the spine is tilted forward and the handle is at least eight inches below its stable height causing the spine and golf bag to return to the standing position when the handle is released after the handle is at least eight inches below its stable height, the cart having no additional weights added to it besides the golf bag with contents to make the cart automatically stand up when the handle is released after the handle is at least eight inches below its stable height at the standing position.

2. A cart as described in claim 1 wherein the handle being adjustable to a desired position so that whatever the desired position the handle has been adjusted to, the spine and golf bag returning to the standing position when the handle is released after the handle is at least eight inches below its stable height.

3. A cart as described in claim 2 wherein the support mechanism includes a 3-foot support.

4. A cart as described in claim 3 wherein the support mechanism includes a wheel base connected to the spine and extending from the bottom portion, said wheel base having a first side and a second side; a first wheel and a second wheel connected to the first side and second side, respectively, of the wheel base, said first wheel and second wheel being a first foot and a second foot of the 3-foot support; and a stabilizer bar connected to and extending from the bottom portion behind the spine, said stabilizer bar having a stabilizer foot which is a third foot of the 3-foot support mechanism.

5. A cart as described in claim 4 wherein the handle will automatically return to its stable position from at least 8 inches below its stable position with only gravity acting on the handle.

6. A cart as described in claim 5 wherein the handle extends at an angle of less than 90 degrees from the spine.

7. A cart as described in claim 6 wherein the length of the stabilizer bar is adjustable.

8. A cart as described in claim 7 wherein the handle is linearly adjustable.

9. A cart as described in claim 8 wherein the length of the handle is adjustable so that the center of gravity remains positioned behind the wheel base for at least 8 inches of forward tilt.

10. A cart as described in claim 9 wherein the stabilizer bar has a stabilizer bar lock for locking the stabilizer bar into a desired position.

11. A cart as described in claim 10 wherein the spine is perpendicular to the ground in the standing position.

12. A cart as described in claim 11 wherein the spine has a handle bracket attached to the top portion, and including a handle screw trapped to the handle bracket.

13. A cart for a golf bag comprising:
a spine having a top portion and a bottom portion, and a top side and an underside, said spine having a support frame which extends from the top side away from the underside and are positioned about the golf bag to support the golf bag with the spine in a position between 80°–100° with ground, the spine having an angle between 80°–100° with ground when the cart is in a standing position;
a handle connected to the spine and extending from the top portion forward of the spine, said handle having a stable height from ground, the handle being adjustable to a desired position; and
a support mechanism connected to and extending from the bottom portion, said support mechanism able to support the spine and the golf bag in the standing position, said support mechanism having a wheel mechanism with wheel legs cut at compound angles with respect to each other on which the support mechanism rolls along ground to facilitate the movement of the spine and golf bag, the support mechanism together with the golf bag, the spine and the handle define a center of gravity over the support mechanism and behind the spine when the spine is tilted forward and the handle is at least eight inches below its stable height whatever the desired position the handle has been adjusted to causing the spine and golf bag to return to the standing position when the handle is released after the handle is at least eight inches below its stable height at the standing position.

14. A cart as described in claim 13 wherein the support mechanism includes a 3-foot support.

15. A cart as described in claim 14 wherein the support mechanism includes a wheel base connected to the spine and extending from the bottom portion, said wheel base having a first side and a second side; a first wheel and a second wheel connected to the first side and second side, respectively, of the wheel base, said first wheel and second wheel being a first foot and a second foot of the 3-foot support; and a stabilizer bar coated to and extending from the bottom portion behind the spine, said stabilizer bar having a stabilizer foot which is a third foot of the 3-foot support mechanism.

16. A cart as described in claim 15 wherein the stabilizer bar, wheel base and handle together with the golf bag on the support mechanism define the center of gravity behind the center of the wheels when the spine is tilted and the handle is at least 8 inches below its stable height and the support mechanism is on level ground.

17. A cart as described in claim 16 wherein the handle will automatically return to its stable position from at least 8 inches below its stable position with only gravity acting on the handle.

18. A cart as described in claim 17 wherein the handle extends at an angle theta of less than 90 degrees from the spine.

19. A cart as described in claim 18 wherein the length of the stabilizer bar is adjustable so the stabilizer foot can be positioned outside the circumference of the golf bag when the golf bag is disposed on the support mechanism.

20. A cart as described in claim 19 wherein the handle is linearly adjustable.

21. A cart as described in claim 20 wherein the length of the handle is adjustable so that the center of gravity remains positioned behind the wheel base for at least 8 inches of forward tilt.

22. A cart as described in claim 21 wherein the stabilizer bar has a stabilizer bar lock for locking the stabilizer bar into a desired position.

23. A cart as described in claim 22 wherein the spine and golf bag are perpendicular to the ground in the standing position.

24. A cart as described in claim 23 wherein club removal from the bag is facilitated by the vertical mounting of the golf bag on the cart and the position of the handle relative to the spine.

25. A cart as described in claim 24 wherein the spine has a handle bracket attached to the top portion, and including a handle screw trapped to the handle bracket.

26. A method for moving a golf bag comprising the steps of:

placing the golf bag on a golf cart having a spine between 80°–100° with ground when the cart is in a standing position so the golf bag is at an angle of 80°–100° with ground;

grabbing a handle of the cart holding the golf bag;

tilting the handle of the cart holding the golf bag forward wherein the center of gravity of the cart with the golf bag is behind the wheel base of the cart and the handle is at least 8 inches below a stable height;

pulling the cart along the ground; and releasing the cart without applying any force to it, wherein the cart under only force of gravity moves to a standing position with the golf bag essentially vertical from the ground and the handle returning to its stable height at the standing position.

27. A method as described in claim 26 including after the releasing step there is the step of lifting a golf club essentially vertically upwards out of the bag.

28. A method as described in claim 27 including the step of adjusting the position of the handle.

* * * * *